United States Patent [19]

Bihuniak et al.

[11] 4,047,966

[45] Sept. 13, 1977

[54] METHOD OF ENHANCING THE REFRACTORINESS OF HIGH PURITY FUSED SILICA

[75] Inventors: Peter P. Bihuniak, Corning; Donald L. Guile, Horseheads, both of N.Y.

[73] Assignee: Corning Glass Works, Corning, N.Y.

[21] Appl. No.: 680,460

[22] Filed: Apr. 26, 1976

[51] Int. Cl.$^2$ ............................................. C04B 35/14
[52] U.S. Cl. ...................................... 106/69; 106/73.5
[58] Field of Search .......................... 106/52, 69, 73.5; 423/335, 338, 339

[56] References Cited

U.S. PATENT DOCUMENTS

| 3,370,921 | 2/1968 | Wagstaff | 106/69 |
| 3,848,152 | 11/1974 | Schultz | 106/52 |

Primary Examiner—J. Poer
Attorney, Agent, or Firm—Milton M. Peterson; Clinton S. Janes, Jr.; Clarence R. Patty, Jr.

[57] ABSTRACT

A method is disclosed wherein high purity fused silica is produced from a liquid flowable form of a silica slurry or sol and the refractoriness of the fused silica is enhanced by homogeneously doping the silica with aluminum and/or titanium oxide, preferably in conjunction with elemental silicon.

13 Claims, No Drawings

METHOD OF ENHANCING THE REFRACTORINESS OF HIGH PURITY FUSED SILICA

BACKGROUND OF THE INVENTION

This invention relates to a method of producing fused silica of very high purity, and more particularly to a method of increasing the refractoriness of the silica by doping with controlled minute amounts of aluminum and/or titanium oxides.

High purity fused silica can be produced from a number of different materials, and by various different procedures. A commercially used process involves vapor phase oxidation of silicon tetrachloride ($SiCL_4$) to silica. This process is generally described for example in U.S. Pat. No. 2,272,342 granted Feb. 10, 1942 to J. F. Hyde. Various other halides, silanes, and other volatile silicon compounds may be employed in lieu of the chloride. Alternatively, combustion processes such as are described in U.S. Pat Nos. 2,823,982, granted Feb. 18, 1958 to O. Saladin et al., and 3,698,936, granted Oct. 17, 1972 to H. J. Moltzan may be employed. Also, hydrolytic processes starting with organic silicates are well known. The main factor in achieving a high purity level with any of these processes is the purity of the particular starting material selected.

The purity factor is very important in certain products such as the silica crucibles used in melting and drawing elemental silicon for semiconductor use. For such purposes alkali metal ions must be below 10 parts per million (ppm) and the transition metals must be below 1 ppm.

In addition to a high purity level, fused silica is frequently required to have a relatively high refractoriness or heat resistance. This characteristic is commonly identified with reference to the viscosity-temperature relationship of the ultimate vitrified silica. Glass annealing and strain points are commonly recognized and readily measured indicia of refractoriness or heat resistance.

PRIOR ART

Various techniques and materials for producing high purity fused silica have already been acknowledged.

It is also known that the addition of certain dopants will increase the viscosity of fused silica as indicated by an increase in the glass strain and annealing points. Thus, U.S. Pat. No. 3,848,152 granted Nov. 12, 1974 to P. C. Schultz discloses adding 100 to 10,000 ppm (0.01 to 1.0%), on a cation mole basis, of one or more selected dopant oxides for this purpose. However, these dopants, in such amounts, would be regarded as unacceptable impurity levels for many purposes and hence could not be used. Furthermore, they may increase devitrification tendencies in fused silica.

U.S. Pat. No. 3,370,921, granted Feb. 27, 1968 to F. E. Wagstaff, describes a method of enhancing the devitrification resistance of fused silica which consists in adding one hundred ppm (equivalent to 0.01% by weight) of elemental silicon to dried, powdered fused silica to produce, on firing, an oxygen deficient material that has an enhanced resistance to devitrification. No mention is made regarding the effect of such addition on any other properties of the material.

RELATED APPLICATIONS

Ser. No. 680,451, filed of even date herewith by P. P. Bihuniak and D. L. Guile, and entitled "Method of Enhancing the Refractoriness of High Purity Silica", discloses and claims the use of one or more selected oxides, in minute amounts and in conjunction with elemental silicon, as a combination dopant to increase the refractoriness of fused silica.

Ser. No. 680,459, filed of even data herewith by C. H. Baumgartner and P. P. Bihuniak, and entitled "Method of Enhancing the Refractoriness of High Purity Silica", discloses and claims the use of elemental silicon alone as a dopant to increase refractoriness of fused silica.

Ser. No. 680,061, filed of even data herewith by P. P. Bihuniak, L. H. Brandes, and D. L. Guile, and entitled "Method of Densifying Metal Oxides", discloses and claims a method of densifying fumed silica and of producing fused silica articles therefrom.

SUMMARY OF THE INVENTION

It is a primary purpose of the invention to provide a method of enhancing the refractoriness of fused silica. A more specific purpose is to enhance the refractoriness of high purity fused silica by controlled doping with minute amounts of a selected oxide. Another purpose is to provide a doped fused silica of otherwise high purity and having an enhanced refractoriness.

To these and other ends, our invention is an improved method of producing a high purity fused silica product, wherein a liquid flowable form of a silica sol or slurry is dried to form solid silica bodies which may then be thermally vitrified, the improvement, whereby the refractoriness of the fused silica is enhanced, comprising doping the silica containing liquid, and thereby the solid silica bodies, with 10 to 1000 parts per million (ppm) by weight as based on the fused silica, of aluminum and/or titanium oxide. In preferred embodiments, aluminum is the dopant oxide and/or elemental silicon is added in conjunction with the oxide.

Any of the known sources of high purity silica may serve as a starting material for present purposes. These include, for example, hydrolyzed organosilicates, in particular ethyl silicates, hydrolyzed silicon tetrachloride, and an aqueous sol of fumed silica. The critical requirements are that the starting material have a requisite degree of purity, and be in the form of, or be capable of conversion to, a colloidal suspension in the nature of a silica sol or slurry.

A minute amount of finely divided aluminum or titanium oxide is then throughly dispersed in the silica containing liquid, preferably by dispersion with a mechanical mixer. It has been found that while particle size is not critical, improved results are generally obtained with finer subdivision, and we prefer to use materials that either dissolve or that will pass through a 325 mesh screen (44 microns). While we use the term "oxide", this is intended to include any oxide precursor such as decomposable metal salts (e.g. nitrates or carbonates) and oxidizable elemental metals. Also mixtures are contemplated.

The silica containing liquid, also containing the dispersed oxide dopant, is dried to produce doped silica fragments or chunks which are heat treated to prepare the silica for further processing. The heat treatment also causes the dopant oxide to become structurally incorporated, thus, effecting the desired increase in refractoriness as discussed subsequently. The silica fragments may be heated directly to vitrification temperatures if direct article forming, such as fiber formation, is desired. Alternatively, the fragments may be calcined in the temperature range of 1150° C. to 1500° C. preparatory to milling to a particle size suitable for slip casting.

The processing conditions are not critical. However, we prefer those described in companion application Ser. No. 680,061, filed of even data herewith by Bihuniak, Brandes and Guile. Briefly, the procedure of that application comprises delivering the silica containing liquid in a stream or layer customarily about ⅛ inch to ¼ inch in thickness and drying such stream to a rigid state. On further drying, the rigid material dices up into small particles, the size being generally dependent on thickness of the layer. When calcined at 1150° C. to 1500° C., these particles are of optimum size for wet milling with a casting medium to provide a slip for casting articles such as crucibles.

When sols, undoped with any additive, are dried and ultimately converted into fused silica glass bodies, the glasses are found to have annealing points that may very from about 1000° C. to somewhat higher than 1100° C., depending on the raw material source, the previous firing conditions and other factors. Correspondingly, the strain points very from about 900° C. to somewhat higher than 1000° C.

It has been shown in companion application Ser. No. 680,459 that indicia of viscosity can be raised a substantial amount when elemental silicon is incorporated as an additive in a silica sol in amounts of at least 200 parts per million by weight. We have now discovered that similar enhancing of fused silica refractoriness, as demonstrated by substantially increased annealing and strain points, can be attained by adding aluminum and/or titanium oxides in minute amounts as a fused silica dopant.

We have found that as little as twenty parts per million of one of these oxides can have an appreciable effect. This is enhanced somewhat with larger amounts. Also, such small amounts are difficult to control and disperse uniformly. However, we find that optimum results are generally obtained at about 100-150 ppm, and that larger amounts provide no benefits and may even diminish somewhat in effectiveness. Also larger amounts not only introduce purity problems, but increase devitrification tendencies. Accordingly, we prefer to employ our oxide dopants in the range of 20 to 200 ppm, as measured on a cation or metal basis rather than the oxide basis. In general, aluminum oxide appears to be the most effective oxide additive and, hence, represents a preferred embodiment.

The effective form of dopant is believed to be the oxide. However, it is not necessary to add the dopant in this form. Thus, as pointed out earlier, decomposable salts, such as nitrates and carbonates, may be used. These may be particularly useful where they are water soluble. Alternatively, we have used elemental aluminum and/or titanium in finely divided form. The requisite than appears to be an oxide precursor in sufficient amount to provide the prescribed amount of oxide.

We have further found that the present dopants do not replace silicon. Rather, we have found that the degree of refractoriness, as indicated by increases in annealing and strain points, is substantially further increased when one of the present oxide dopants, particularly alumina, is used in conjunction with silicon. Thus, there appears to be a cooperative or complementary effect achieved. Accordingly, the preferred form of our invention involves using a combination of silicon and aluminum oxide as dopants.

As explained in companion application Ser. No. 680,459, it is believed that the silicon dopant reacts with structurally bound hydroxyl ions (also referred to sometimes as residual water), liberating hydrogen and tying up the otherwise open or weak silica structure. This belief is supported by so-called $B_{OH}$ data, that is, —OH vibrational stretching absorption coefficients located at 2.73 microns, as a measure of retained hydroxyl ions (water). It is possible that the oxides also exert an influence on hydroxyl ion retention. However, available data do not tend to support this theory.

We prefer then to explain the oxide effect in a different manner. In the minutely small concentrations involved here, the dopant oxides may be substitutional in character within the fused silica network. That is to say, they may behave as 4-coordinated network formers, thus associating with previously weakened sites in the silica structure, that is, sites of non-bridging oxygens. This tying up of the structure would tend to raise viscosity. However, as more dopant is added, we believe the dopant tends to revert back to its normal network modifying role, whereby viscosity is either unaffected or somewhat decreased.

SPECIFIC EMBODIMENTS

EXAMPLES 1-10

A series of aqueous silica sols was prepared by mixing, in a paddle type food mixer, fumed silica and water in a weight ratio of about 3:7, thus providing about 30% by weight silica in each sol sample prepared. The fumed silica was a commercial product characterized by a surface area of about 200m²/gram and a density of 4 lbs./cu. ft. In each case, the fumed silica and water were mixed for several minutes at high speed to obtain a well-dispersed flowable sol having a viscosity of a few hundred centipoises.

Prior to mixing, a combination of finely divided (less than 44 microns) elemental silicon and aluminum oxide, calculated as the cation or metal on a weight basis, was added as a dopant to each sol. In this series, the silicon addition was held constant at 500 ppm, by weight as based on total solids, while the aluminum oxide was varied in amount as shown in Table I below. The doped silica batches thus prepared were mixed for a sufficient time (15-20 minutes) to provide a uniform dispersion of the dopants in a thin watery sol.

The sols were individually poured onto drying trays consisting of a flat rectangular plate having one-eighth inch peripheral barriers, whereby a layer of the sol in such depth was contained on the tray. The tray was placed over an electrically heated plate of approximately the tray dimensions and the layer of sol dried by heating just below the boiling point. As each doped sol dried, it became rigid, contracted, and then fragmented into small pieces about the size of the layer thickness. These pieces were collected and calcined in an electric oven (dry atmosphere) at about 1350° C. for one-half hour to densify the material. Subsequently, the calcined fragments were placed in a ball mill and milled with a casting medium to form a casting slip. The slip was cast to produce "green" bodies (test blocks) which were divided into two lots. One lot was calcined by heating for 1 hour in an electric fired oven at 1100° C.; the other by heating for one hour in a gas fired oven at 1100° C. The calcined bodies were then vitrified in a final firing for 5 to 7 minutes at about 1800° C. in a helium-argon atmosphere.

The fused silica glasses thus produced were subjected to various measurements, the data being recorded in Table I also. The measurements included annealing point (Ann. Pt.) in degrees C., and residual water or hydroxyl ion in terms of $B_{OH}$. The latter is a value calculated from transmission (T) measurements at 2.73 micron wavelength, and glass thickness (t) in mm., the value being calculated from the formula:

$$B_{OH} = \frac{1}{t} \log_{10} \frac{T}{T_o}$$

wherein $T$ is transmission of 2.73 wavelength radiation in a sample, and $T_o$ is corresponding transmission in a theoretically dry glass.

TABLE I

| Number | Al (ppm) | Ann. Pt. Gas | Ann. Pt. Elec. | $B_{OH}$ Gas | $B_{OH}$ Elec. |
|---|---|---|---|---|---|
| 1 | — | 1127 | 1142 | .142 | .004 |
| 2 | 10 | 1132 | 1173 | .128 | .001 |
| 3 | 20 | 1174 | 1175 | .088 | .002 |
| 4 | 30 | 1191 | 1204 | .110 | .010 |
| 5 | 45 | 1182 | 1206 | .117 | .003 |
| 6 | 60 | 1186 | 1211 | .106 | .010 |
| 7 | 100 | 1189 | 1219 | .118 | .002 |
| 8 | 500 | 1170 | 1204 | .130 | .003 |
| 9 | 1000 | 1169 | | .088 | .002 |
| 10 | 2000 | 1174 | | .063 | .002 |

Two things quickly become apparent from the data. In general, a substantially higher annealing point, and hence viscosity, is obtained by "dry" firing in an electric oven, than by gas firing. Also, optimum benefits are obtained with about 30 up to 100 parts aluminum which is equivalent to about 60 to 200 parts aluminum oxide. Larger amounts not only fail to improve, but result in a slightly lower viscosity.

EXAMPLES 11-22

A similar series of silica sols was prepared in the manner described above and then converted to vitrified slip cast glass bodies in the manner described. In these examples, each sol was doped with either 30 or 60 ppm. aluminum added as finely divided aluminum oxide and a predetermined, but different, amount of elemental silicon.

Each doped sol was dried, calcined, milled and cast as before to produce a green body that was calcined at 1100° C. and then fired at a vitrifying temperature of about 1800° C. For each sol, the cast test pieces were divided into two portions, as in the prior examples, with one portion being calcined in a gas fired oven (moist atmosphere) and the other in an electric oven (dry atmosphere).

Each sample is identified in Table II by its characteristic content of dopant. For each sample, the annealing point (Ann. Pt.) and $B_{OH}$ values are given for each type of firing.

TABLE II

| Number | Al (ppm) | Si (ppm) | Ann. Pt. Gas | Ann. Pt. Elec. | $B_{OH}$ Gas | $B_{OH}$ Elec. |
|---|---|---|---|---|---|---|
| 11 | 30 | — | 1159 | 1176 | .161 | .065 |
| 12 | 60 | — | 1163 | 1187 | .156 | .069 |
| 13 | 30 | 100 | 1166 | 1192 | .159 | .058 |
| 14 | 60 | 100 | 1175 | 1193 | .124 | .052 |
| 15 | 30 | 200 | 1169 | 1208 | .142 | .034 |
| 16 | 60 | 200 | 1172 | 1208 | .129 | .030 |
| 17 | 30 | 500 | 1191 | 1204 | .110 | .010 |
| 18 | 60 | 500 | 1186 | 1211 | .106 | .010 |
| 19 | 30 | 700 | 1194 | 1213 | .103 | .002 |
| 20 | 60 | 700 | 1190 | 1222 | .117 | .005 |
| 21 | 60 | 1000 | 1204 | 1223 | .079 | |
| 22 | 60 | 2000 | 1220 | | .034 | .005 |

The data of Table II demonstrate that a minute amount of aluminum oxide along provides a very substantial improvement in the viscosity of fused silica, but that optimum effects are achieved when aluminum oxide is combined with silicon. It also appears that little benefit is gained with large amounts of silicon, particularly with the dry firing of an electric oven, and we prefer not to exceed about 800 ppm silicon. The data again demonstrate the advantage of dry firing.

It is interesting to compare the beta values of the two tables in conjunction with annealing points. While the silicon data indicate a direct correlation between water content and annealing point, the aluminum oxide data indicate that the effect of the oxide must be explained otherwise, perhaps in terms of entry in the network as earlier suggested.

EXAMPLES 23-26

Two further silica sols were prepared in the manner described above and then converted to vitrified, slip cast bodies in the same manner as described above. In one sol, aluminum metal in finely divided form was mixed with the silica in the mixer, while in the other finely divided titanium metal was added as dopant. Each sol sample thus produced was dried, calcined, milled, cast and fired as before. For each sample, the cast test pieces were again divided in two portions with one portion being fired and vitrified in an electric oven, while the other was fired and vitrified in a gas fired oven.

The annealing and strain points were measured and these data together with sample identification by dopant in parts per million by weight on a solids basis are shown in Table III.

TABLE III

| Number | Dopant | Firing | Ann. Pt. | St. Pt. |
|---|---|---|---|---|
| 23 | Al (77 ppm) | Gas | 1156 | 1036 |
| 24 | Al (77 ppm) | Elec. | 1176 | 1063 |
| 25 | Ti (48 ppm) | Gas | 1157 | 1043 |
| 26 | Ti (48 ppm) | Elec. | 1176 | 1066 |

EXAMPLES 27-33

Another series of silica sols was prepared and converted to fused silica as before. In each of these examples, alumina was added as dopant in conjunction with silicon, but in different form to determine the effect of this variation on its effectiveness in enhancing refractoriness. In Example 27, 200 ppm for finely divided elemental silicon and 60 ppm of aluminum, in the form of aluminum nitrate, were added as dopants; in Example 28, 500 ppm of silicon and 30 ppm aluminum (as aluminum nitrate) were added; in Example 29, 500 ppm silicon and 60 ppm aluminum (as aluminum oxide) were added; in Example 30, 500 ppm silicon and 30 ppm aluminum (as the oxide) were added; in Example 31, 500 ppm silicon and 30 ppm aluminum (added as a powdered hydrated alumina commercially available under the name "Dispal M") were added; in Example 32, 500 ppm silicon and 30 ppm aluminum (as aluminum metal) were added; in Example 33, 200 ppm silicon and 60 ppm aluminum (as the metal) were added.

Table IV sets forth the annealing points and $B_{OH}$ measurements made on these glasses, each exemplary glass having been produced both by electric firing and by gas firing as previously.

TABLE IV

| Example | Ann. Pt. | | $B_{OH}$ | |
|---|---|---|---|---|
| | Elec. | Gas | Elec. | Gas |
| 27 | 1211 | 1178 | 0.016 | 0.093 |
| 28 | 1209 | 1200 | 0.011 | 0.082 |
| 29 | 1211 | 1186 | 0.010 | 0.106 |
| 30 | 1204 | 1191 | 0.010 | 0.110 |
| 31 | 1218 | 1200 | 0.014 | 0.094 |
| 32 | 1202 | 1186 | 0.014 | 0.094 |
| 33 | 1211 | 1163 | 0.020 | 0.132 |

We claim:

1. In an improved method of producing a high purity fused silica product, wherein a liquid flowable form of a silica slurry or sol is dried to form solid silica bodies which are then thermally vitrified, the improvement, whereby the refractoriness of the fused silica is enhanced, which comprises doping the silica containing liquid with 10 to 1000 parts per million by weight, as based on the fused silica, of aluminum and/or titanium oxide calculated on the metal basis.

2. In a method in accordance with claim 1, the further improvement which comprises dispersing, in conjunction with the selected oxide, up to 1500 parts per million by weight of elemental silicon.

3. A method in accordance with claim 1 wherein the selected oxide is aluminum oxide.

4. A method in accordance with claim 2 wherein the selected oxide is 20 to 200 parts per million aluminum oxide, calculated on the metal basis, and the elemental silicon is in the range of 200 to 800 parts per million.

5. A method for producing a high purity fused silica product which comprises the steps of doping a liquid flowable form of silica slurry or sol with 10 to 1000 parts per million by weight, as based on the fused silica, of aluminum and/or titanium oxide, calculated on the metal basis, drying the doped source of silica to rigid silica fragments containing the doping oxide, calcining the silica fragments at about 1150°-1500° C., and then firing said silica fragments to a fused silica product.

6. A method in accordance with claim 5 wherein the selected oxide is aluminum oxide.

7. A method in accordance with claim 5 which further comprises dispersing, in conjunction with the selected oxide, up to 1500 parts per million by weight of elemental silicon.

8. A method in accordance with claim 7 wherein the selected oxide is 20 to 200 parts per million aluminum oxide and the elemental silicon is in the range of 200 to 800 parts per million.

9. A method in accordance with claim 5 wherein the calcined product is milled to form a slip which is cast in a mold and the product thus formed is fired to a fused silica body of corresponding shape.

10. A method of enhancing the refractoriness of a fused silica product which comprises doping a liquid flowable form of a silica slurry or sol with 10 to 1000 parts per million by weight, as based on the fused silica, of aluminum and/or titanium oxide, calculated on the metal basis, drying the oxide doped source of silica to form solid silica bodies, and firing said silica bodies to a fused silica product.

11. A method in accordance with claim 10 wherein the selected oxide is aluminum oxide.

12. A method in accordance with claim 10 which further comprises doping, in conjunction with the selected oxide, with up to 1500 parts per million by weight of elemental silicon.

13. A method in accordance with claim 12 wherein the selected oxide is 20 to 200 parts per million aluminum oxide and the elemental silicon is in the range of 200 to 800 parts per million.

* * * * *